United States Patent
Jung et al.

(10) Patent No.: US 7,873,914 B2
(45) Date of Patent: Jan. 18, 2011

(54) MULTI-LAYER FOCUSING METHOD AND APPARATUS THEREFOR

(75) Inventors: Kil-soo Jung, Gyeonggi-do (KR); Jung-wan Ko, Gyeonggi-do (KR); Hyun-kwon Chung, Seoul (KR); Jung-kwon Heo, Seoul (KR); Sung wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2480 days.

(21) Appl. No.: 10/385,464

(22) Filed: Mar. 12, 2003

(65) Prior Publication Data
US 2003/0174170 A1   Sep. 18, 2003

(30) Foreign Application Priority Data
Mar. 16, 2002   (KR) .............................. 2002-14275

(51) Int. Cl.
*G06F 3/00* (2006.01)
*H04N 5/445* (2006.01)
*G06F 3/048* (2006.01)

(52) U.S. Cl. .................. 715/802; 715/840; 715/767
(58) Field of Classification Search ................. 715/767, 715/840, 802
See application file for complete search history.

(56) References Cited

U.S. PATENT DOCUMENTS

| | | | |
|---|---|---|---|
| 5,544,354 A | | 8/1996 | May et al. |
| 6,075,575 A * | | 6/2000 | Schein et al. ............ 348/734 |
| 6,154,205 A * | | 11/2000 | Carroll et al. ............ 345/684 |
| 6,388,714 B1 * | | 5/2002 | Schein et al. ............ 348/563 |
| 6,590,594 B2 * | | 7/2003 | Bates et al. .............. 715/784 |
| 6,614,457 B1 * | | 9/2003 | Sanada et al. ............ 715/840 |
| 6,918,090 B2 * | | 7/2005 | Hesmer et al. ........... 715/760 |
| 7,197,717 B2 * | | 3/2007 | Anderson et al. ........ 715/767 |
| 2002/0054146 A1 | | 5/2002 | Fukumoto et al. |

(Continued)

FOREIGN PATENT DOCUMENTS

CN   1194752   9/1998

(Continued)

OTHER PUBLICATIONS

Perez Manuel A., Focus in Graphical User Interfaces, 1993, ACM, p. 255-257.*

(Continued)

*Primary Examiner*—William L Bashore
*Assistant Examiner*—Jordany Núñez
(74) *Attorney, Agent, or Firm*—NSIP Law

(57) ABSTRACT

A method of and an apparatus for efficiently navigating a plurality of contents which are reproduced in a device for reproducing interactive contents, such as a computer, a DVD player, a PDA, or a cellular phone, by using a device having a limited number of input keys. Focusing layer values are allotted to contents elements to form focusing layers and the contents elements included in any one focusing layer are provided to a user. The focusing is moved when a command to move the focusing is input from the user. Accordingly, any kind of media storing interactive contents formed by using markup language is navigable using the device having the limited number of input keys, such as a television remote controller.

12 Claims, 13 Drawing Sheets

U.S. PATENT DOCUMENTS

2004/0100500 A1 *  5/2004  Chung et al. ............... 345/767

FOREIGN PATENT DOCUMENTS

| CN | 1200221 | 11/1998 |
|---|---|---|
| JP | 09-050361 | 2/1997 |
| JP | 09-149329 | 6/1997 |
| JP | 10-136314 | 5/1998 |
| JP | 10-290432 | 10/1998 |
| WO | WO 97/13368 | 4/1997 |
| WO | 98/09437 | 3/1998 |
| WO | WO 00/01142 | 1/2000 |
| WO | WO 00/28396 | 5/2000 |
| WO | WO 01/61508 | 8/2001 |
| WO | WO 01/77906 | 10/2001 |

OTHER PUBLICATIONS

The First Office Action issued Feb. 16, 2007 by the Patent Office of the People's Republic of China re: Chinese Application No. 03806229.1 (11 pp).

U.S. Appl. No. 11/730,295, filed Mar. 30, 2007, Kil-soo Jung et al., Samsung Electronics Co., Ltd.

Chinese Office Action issued in corresponding Chinese Patent Application No. 03806229.1 dated Aug. 24, 2007.

Japanese Office Action issued in corresponding Japanese Patent Application No. 2003-577260 dated Sep. 25, 2007.

European Search Report issued on Jul. 27, 2010, in corresponding European Application No. 03703391.7 (3 pages).

* cited by examiner

RELATED DESCRIPTION 1   LINK 1
LINK 2   LINK 3
RELATED DESCRIPTION 2 ............
..................................
LINK 4

RELATED DESCRIPTION 3 ...................
.............................................
LINK 5   RELATED DESCRIPTION 4 ...............
................................. LINK 6

US 7,873,914 B2

MULTI-LAYER FOCUSING METHOD AND APPARATUS THEREFOR

CROSS REFERENCE TO RELATED APPLICATIONS

This application claims the benefit of Korean Patent Application No. 2002-14275filed Mar. 16, 2002 in the Korean Intellectual Property Office, the disclosure of which is incorporated herein by reference.

BACKGROUND OF THE INVENTION

1. Field of the Invention

The present invention relates to a method of and an apparatus for efficiently performing a navigation process by using a user input device having a limited number of input keys when reproducing interactive contents formed by a markup language in a reproducing device, such as, for example, a computer, a DVD player, a PDA, or a cellular phone.

2. Description of the Related Art

Since specific elements in a markup language document include operations to be performed, which are formed as tags, the elements should be selected by a user in order to perform the corresponding operations. Here, the selected state is referred to as a focus-on state. In the focus-on state, the element receives commands from the user.

Examples of a focusing method, which corresponds to the selection of specific elements, to perform the operations allotted to the elements, are as follows.

First, the elements are set to the focus-on state using a pointing device, such as a mouse or a joystick, based on location information. In other words, the user places a pointer on the element to be focused on and clicks a selection button, on a screen.

Second, a predetermined selection order is allotted to each element and the elements are successively focused on corresponding to the values input from an input device, such as a keyboard. In order to determine the focusing order of the elements when navigating the document using the keyboard, a document producer may determine a tabbing order. Accordingly, the selected element may be activated using a tab key. Here, the tabbing order of the elements is determinable by inputting numbers between 0 and 32767 into a tab index included in an attribution definition of a markup language. The markup elements which support the tab index attribution include "A", "AREA", "BUTTON", "INPUT", "OBJECT", "SELECT", and "TEXTAREA".

Third, access key values are allotted to each element to directly activate or focus the element. Here, the key value is received from the user input device and the corresponding element is directly accessed and focused on.

According to an access key attribution scheme in the attribution definition of the markup language, the access key values are allotted to the elements. Here, each of the access key values is denoted by a corresponding character in a character set, thereby a document producer should consider the keys of the user input device when allotting the access key values to the elements. The markup elements which support the access key attribution include "A", "AREA", "BUTTON", "INPUT", "LEGEND", and "TEXTAREA".

However, the focusing method of the conventional interactive contents formed by the markup language has the following problems. First, the elements included in an embedded object are not controllable. Second, the keys or buttons of the user input unit have only one function each.

In order to solve the first problem, a method of focusing on elements using a pointing device, such as a mouse, as well as the keyboard, and clicking a mouse button, is used. In other words, even when video or audio, which is embedded into WINDOWS® MEDIA PLAYER or REAL PLAYER®, is reproduced, desired operations may be performed by focusing and clicking a play icon, a stop icon, or a pause icon using the mouse. Here, WINDOWS MEDIA PLAYER or REAL PLAYER is a different medium from a viewer, which controls the markup using the "OBJECT" element.

In order to solve the second problem, the range to which the keys or the buttons having the predetermined functions are applied is provided to the user using a multi-window. In other words, a media player window is activated on the markup language document in order to prevent the user from being confused even when the keys or the buttons of the input device have various functions.

FIGS. 1A through 1C are examples of a process of navigating a menu in a conventional DVD-video. If a MENU button 104 of the user input device is pressed when the conventional DVD-video is activated, a menu selection screen 101, which is defined in a disc, is displayed while illustrating highlight information 102 on a selected item. Thus, the user may use a navigation direction key 103 shown in FIG. 1B to select another item and show different highlight information 105 as shown in FIG. 1C.

FIGS. 2A and 2B are diagrams for explaining the conventional focusing method. As shown in FIG. 2A, in the interactive contents of the markup language document including a DVD reproduction screen, the DVD reproduction screen is embedded as the "OBJECT" element and links 1 through 6 may perform specific operations when the links are focused on by using the user input device.

When it is assumed that moving the focusing among the links is performed using the navigation keys, a predetermined operation, such as reproduction, is performed by focusing the DVD reproduction image and pressing an ENTER key. Here, if reproduction is simultaneously performed with the loading of the markup language document, the DVD-video requires only the focusing operation.

FIG. 2B illustrates an example of moving the focusing to another link within the markup language document by pressing the navigation keys for selecting the menu in the DVD reproduction screen. In other words, as shown in FIG. 1B, when navigating the menu on the DVD reproduction screen or the DVD-video, the same key may have to be used to perform the DVD navigation operation. In this case, since the navigation keys are used to move the focusing among the links, the navigation keys are not useable to select the items of the menu in the DVD reproduction screen.

This problem is more serious in the case where the interactive contents are controlled using an input device having a limited number of keys, such as a remote controller.

SUMMARY OF THE INVENTION

The present invention provides a multi-layer focusing method and an apparatus therefor.

According to an aspect of the present invention, there is provided a multi-layer focusing method for focusing contents provided in a multi-layer structure. The method comprises allotting predetermined focusing layer values to contents elements linked to contents to be provided to a user, to form focusing layers; providing list information on the contents elements included in a predetermined focusing layer and focusing on any one contents element of the contents elements provided to the user; receiving a predetermined command from the user; and moving the focusing when the command is to move the focusing. Here, the moving of the focusing comprises determining whether an upper focusing layer of a present focusing layer exists in the case where the command is to change the present focusing layer to the upper focusing layer, and when the upper focusing layer exists, providing the list information on contents elements included in the upper focusing layer to the user and focusing on any one of the contents element included in the upper focusing layer. Alternatively, the moving of the focusing comprises determining whether a lower focusing layer is linked to the focused on contents element in the case where the command is to change the focusing layer to the lower focusing layer, and when the lower focusing layer is linked to the focused on contents element, providing the list information on contents elements included in the lower focusing layer to the user and focusing on any one contents element included in the lower focusing layer. Alternatively, the moving of the focusing comprises moving the focusing to a next contents element based on a predetermined order in the case where the command is to move the focusing within the same focusing layer.

According to another aspect of the present invention, an apparatus for managing multi-layer focusing comprises a contents providing unit which provides contents which are linked to contents elements and are to be provided to a user; a focusing layer information management unit which allots predetermined focusing layer values to the contents elements which are linked to the contents to be provided to the user, to form focusing layers; an input unit which receives commands from the user to move the focusing; an output unit which provides the contents to the user, provides predetermined contents elements, and represents focused on contents elements linked to the contents; and a focusing management unit which provides the list information on the contents elements included in a specific focusing layer and the focusing information for focusing any one of the contents elements provided to the user to the output unit and moving the focusing in the case where the command is to move the focusing.

Additional aspects and/or advantages of the invention will be set forth in part in the description which follows, and, in part, will be obvious from the description, or may be learned by practice of the invention.

BRIEF DESCRIPTION OF THE DRAWINGS

The above and/or other aspects and advantages of the present invention will become more apparent by describing the present invention in detail with reference to the attached drawings in which:

FIG. 8 is a flowchart for explaining a method of processing the operation of navigation keys in the case where an embedded DVD-video is focused on;

FIG. 9C shows an example of a result of signaling a change to a lower level while the DVD-video is focused on;

DESCRIPTION OF THE PREFERRED EMBODIMENTS

Figure 1A:
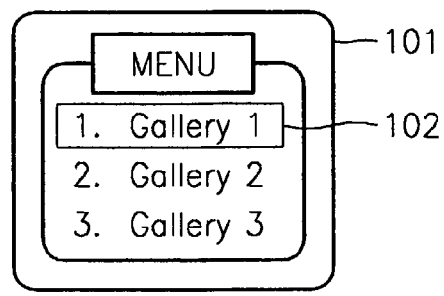
FIG. 1A shows a view of a menu display in a conventional DVD video.
Figure 1B:
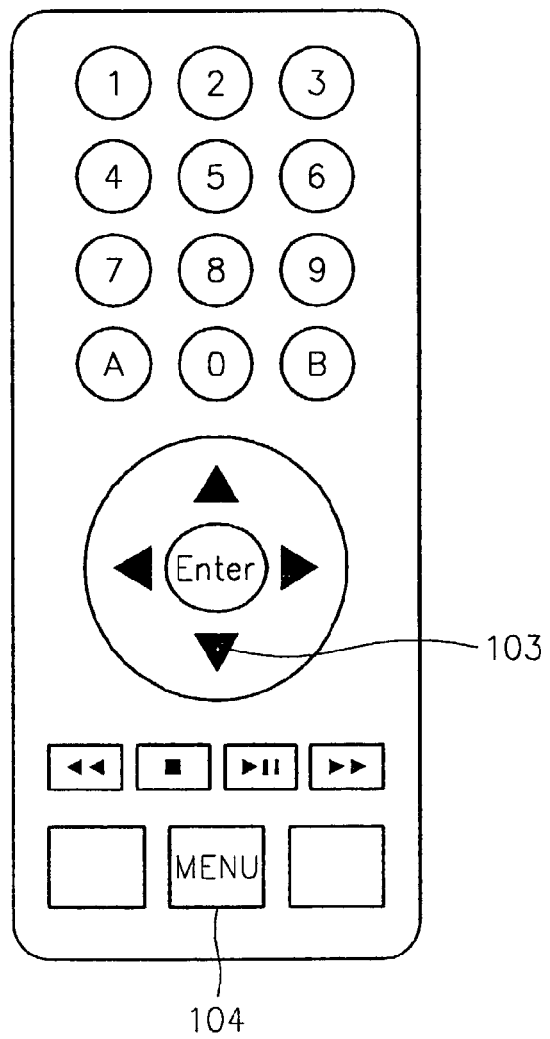
FIG. 1B shows a user input device.
Figure 1C:
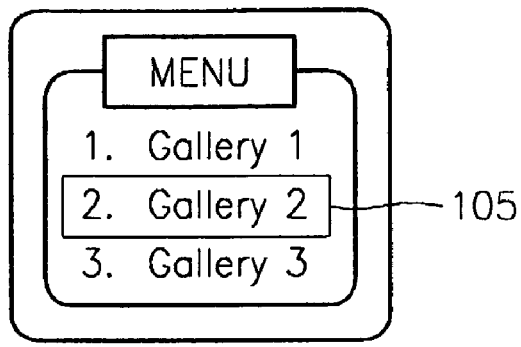
FIG. 1C shows another view of the menu display shown in FIG. 1A.
Figure 2A:
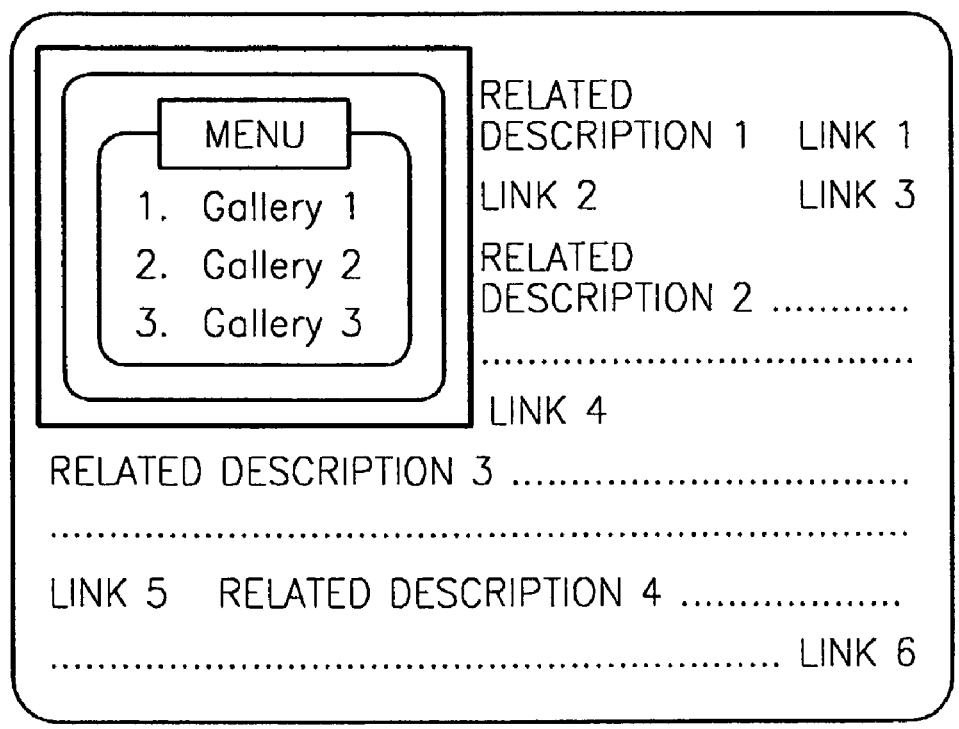
FIG. 2A is a diagram for explaining a conventional focusing method.
Figure 2B:
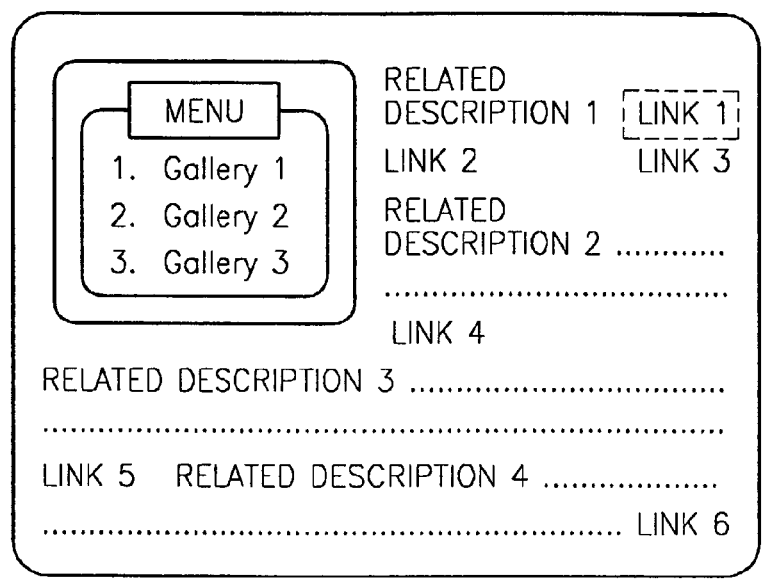
FIG. 2B is another diagram for explaining the conventional focusing method.

Reference will now be made in detail to the present embodiments of the present invention, examples of which are illustrated in the accompanying drawings, wherein like reference numerals refer to like elements throughout.

Figure 3:
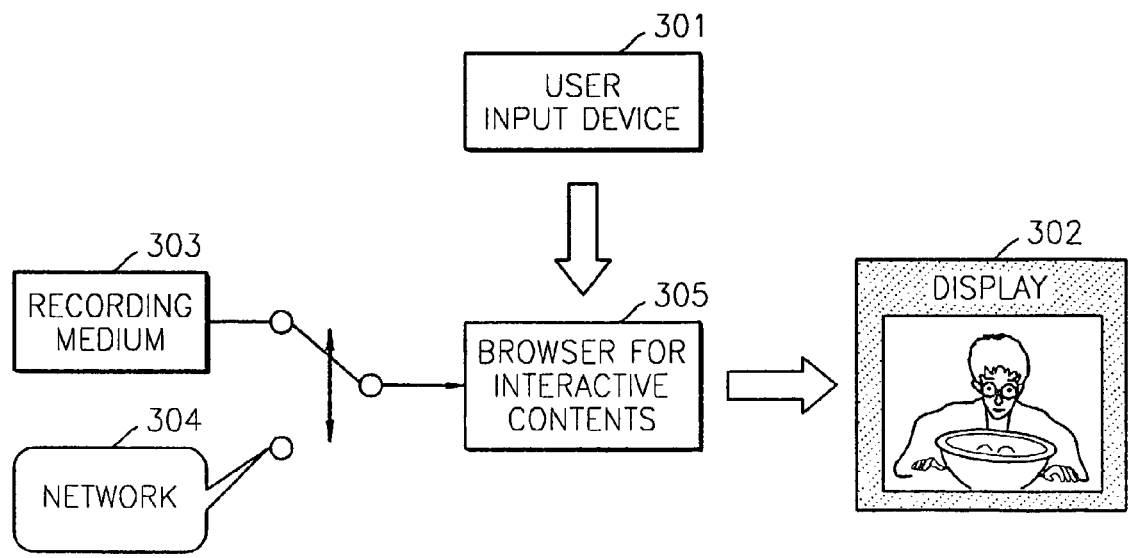
FIG. 3 illustrates an apparatus for multi-layer focusing according to the present invention.

FIG. 3 is a diagram illustrating a structure of a multi-layer focusing apparatus according to the present invention. A user input device 301, for example, a remote controller, receives commands related to focusing from a user. A display device 302 displays the contents selected by the user and the list information on the contents to be selected by the user. Examples of the display device 302 include a television and a computer monitor.

A recording medium 303 stores the contents, which will be provided to the user, and provides the contents to the user through the display device 302 based on the commands from the user. The contents may be provided to the user through a communications network 304.

A browser 305 manages focusing information based on which contents in the contents list information are focused and manages the moving of the focusing based on the commands from the user.

Figure 4:
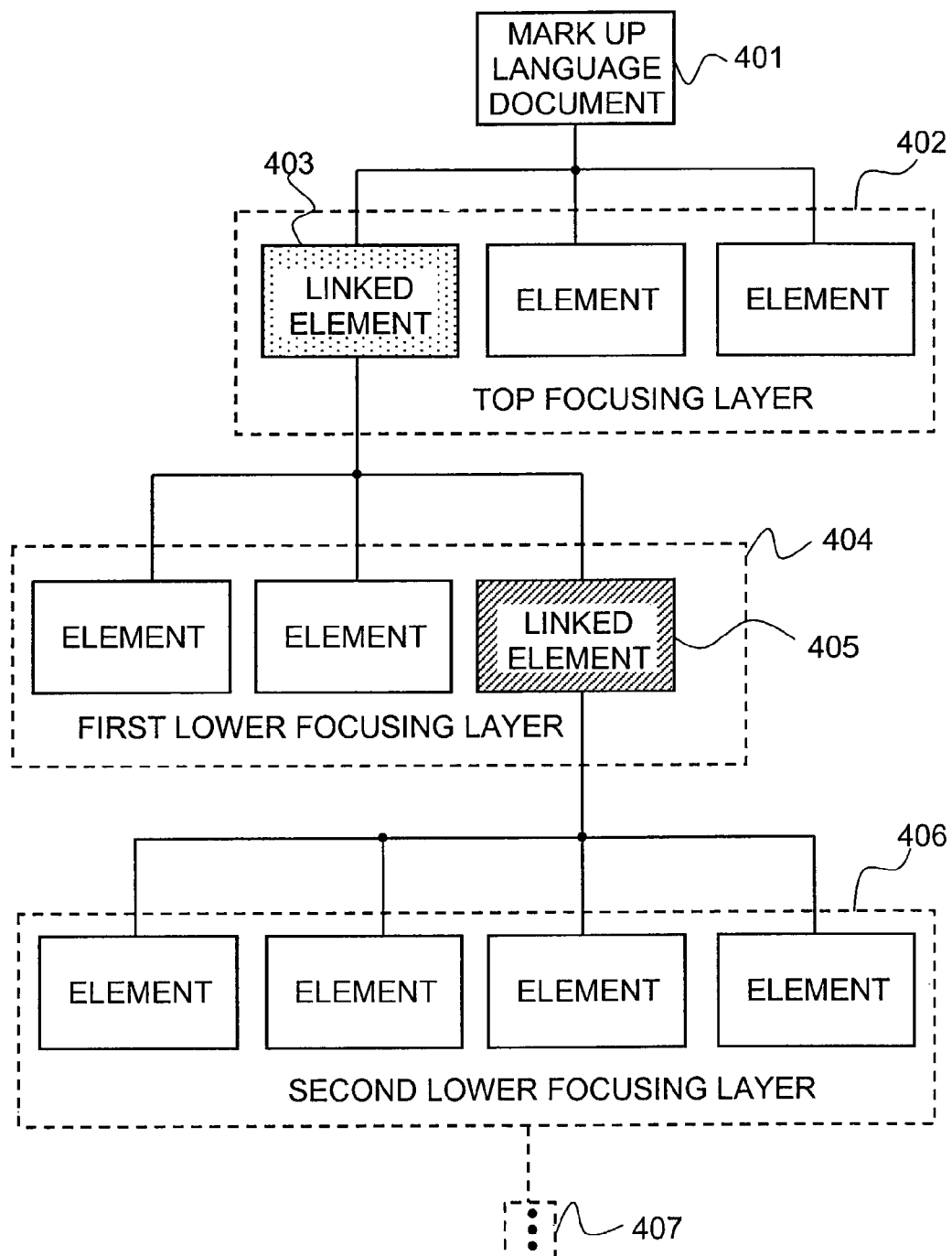
FIG. 4 illustrates a multi-layered focusing structure according to the present invention.

FIG. 4 illustrates a multi-layered focusing structure according to the present invention, for example, a markup language document. Here, reference numeral 401 denotes the markup language document and reference numeral 402 denotes a top-focusing layer. Reference numeral 403 denotes an element linked to a lower focusing layer, among the elements in the top-focusing layer 402. If the user inputs a command of selecting the element 403 and changing the focusing layer to a lower focusing layer, the focusing moves to the lower focusing layer, which is linked to the element 403. Reference numeral 404 denotes a first lower focusing layer. Reference numeral 405 denotes an element linked to another lower focusing layer, among the elements in the first lower focusing layer 404. Reference numeral 406 denotes a second lower focusing layer to which the focusing is moved through the element 405 of the first lower focusing layer 404.

Additional focusing layers may be included in like manner as indicated by reference numeral 407.

In the case of the markup language document, the elements of a lower focusing layer do not have to be the markup language elements. In other words, the elements of the lower focusing layer may be a control menu for controlling the media embedded in the markup language document or the contents input to an input form by the user.

Figure 5A:
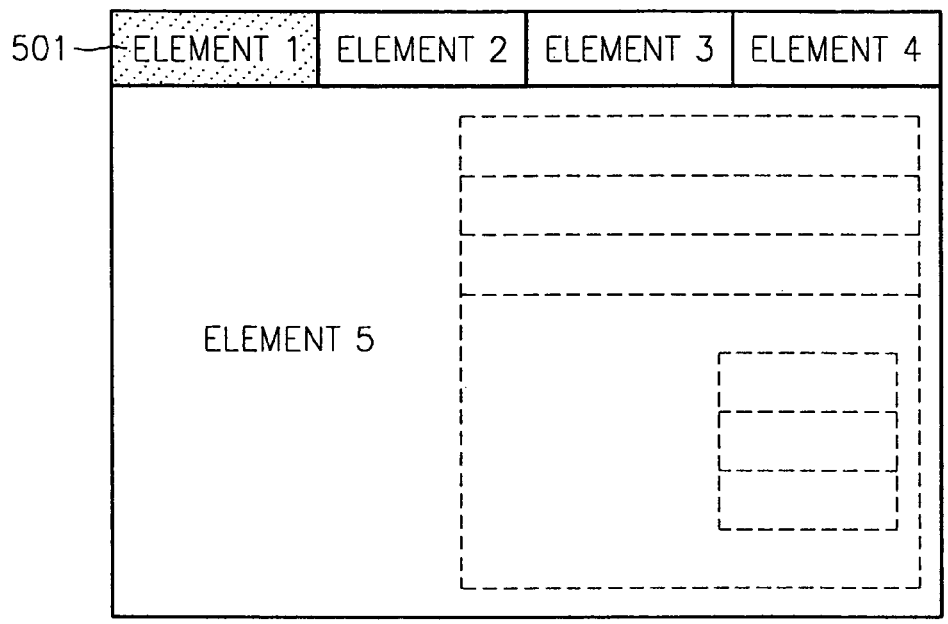
FIG. 5A shows a top-focusing layer wherein an element is focused.
Figure 5B:
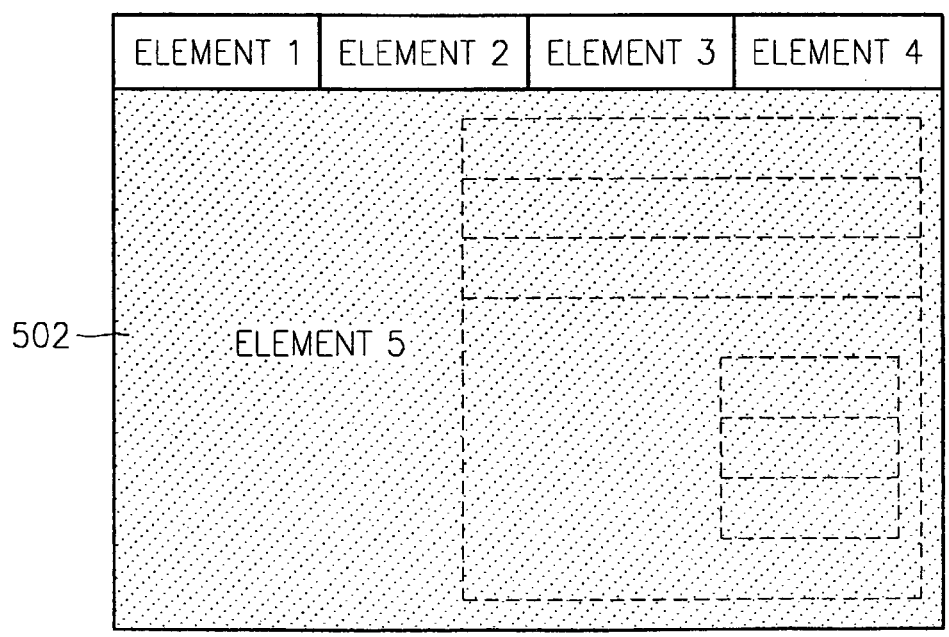
FIG. 5B shows the top focusing layer wherein another element is focused.

FIGS. 5A and 5B illustrate a navigation method in the top-focusing layer of a markup language document including more than one lower focusing layer by using the navigation keys of the user input device according to the present invention. Here, examples of the navigation method include moving the focusing according to a tabbing order of the markup language and moving the focusing to the desired element using an access key attribute of the markup language. The focusing is represented by highlighting in FIGS. 5A and 5B.

Rectangles shown with dashed lines in an element 5 denote that the element 5 includes lower focusing layers to be navigated. Here, an example of the embedded element 5 includes an "OBJECT" element of the markup language.

An element 1 (501) is shown focused in FIG. 5A, and the element 5 (502) is focused in FIG. 5B.

Figure 6A:
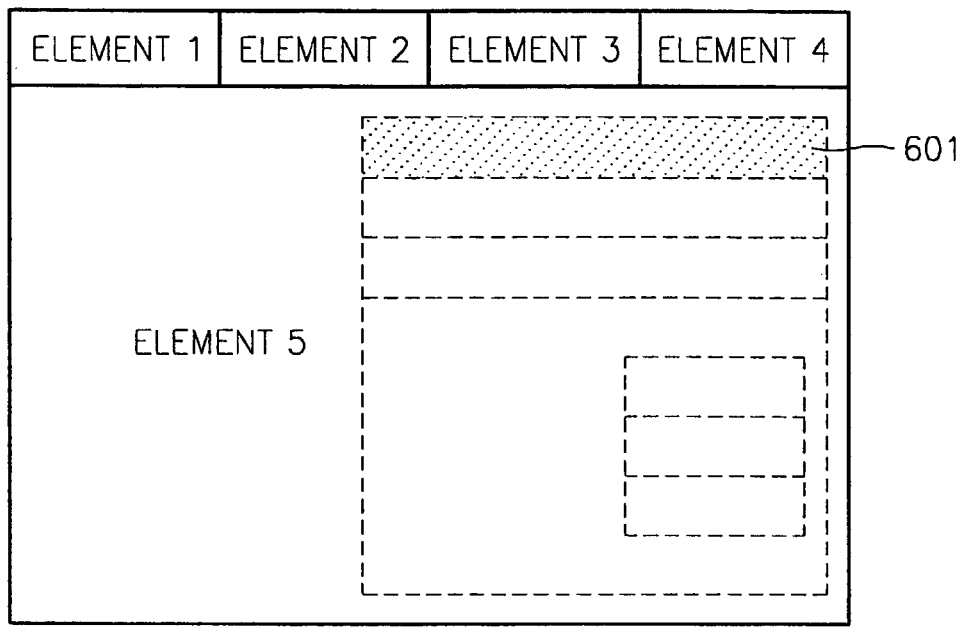
FIG. 6A shows moving focusing from a top-focusing layer to a lower focusing layer.
Figure 6B:
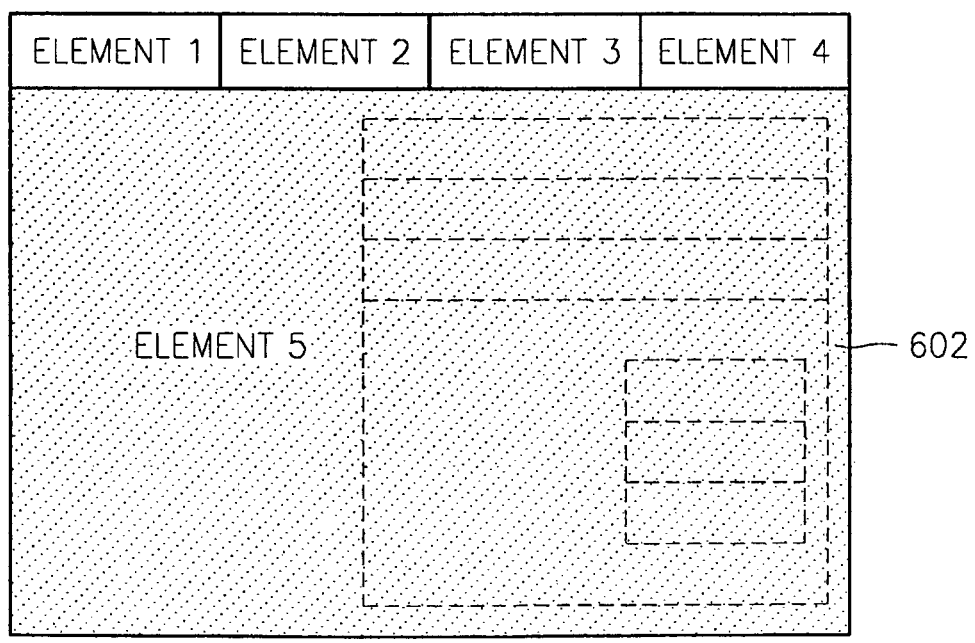
FIG. 6B shows moving focusing from the lower focusing layer to the top focusing layer.

FIGS. 6A and 6B are examples of moving the focusing from the top-focusing layer to the lower focusing layer according to the present invention. In the case where a specific element, for example, the element 5, in the markup language document includes other elements to be navigated, other elements are referred to as the lower focusing layer, which is different from the focusing layer including the presently focused element. When a key or a button for changing the focusing layers is input, the layer having the focused element is changed. When the navigation keys, for example, direction keys, are input, the focused elements are changed within a specific layer.

Meanwhile, the focused elements are represented using different colors according to the focusing layer in order to prevent the user from being confused when performing the navigation using the focusing layers.

FIG. 6A is an example of moving the focusing from the top-focusing layer to the lower focusing layer and focusing an element 601 included in the lower focusing layer. FIG. 6B is an example of moving the focusing from the lower focusing layer to the top-focusing layer and focusing the element 5 (602).

Figure 7A:
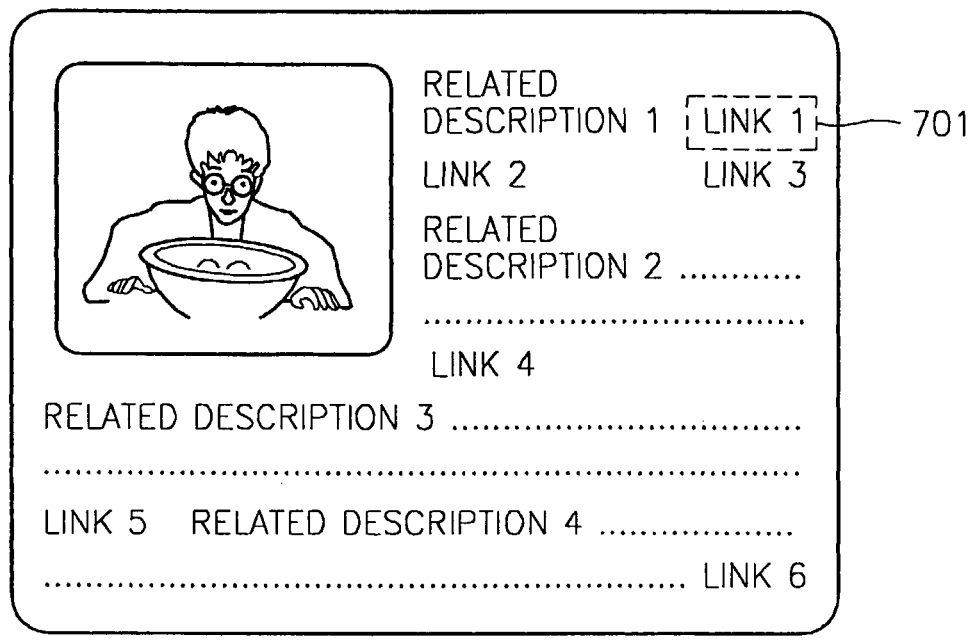
FIG. 7A shows focusing on a focused element in a DVD embedded mode where interactive contents are formed by a markup language.
Figure 7B:
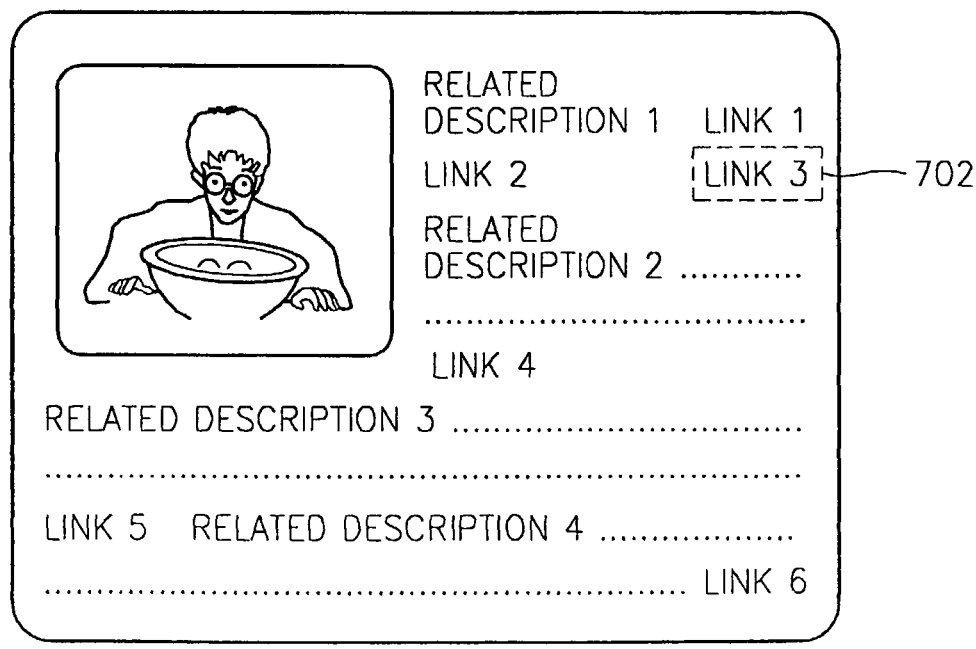
FIG. 7B shows focusing on another focused element as a result of an input of a navigation key.

FIGS. 7A and 7B are examples of navigating each element in a DVD embedded mode where the interactive contents are formed by the markup language.

When the multi-layered focusing method is applied to the DVD, the user may navigate the elements included in the top-focusing layer using the navigation keys of the user input device, on the DVD-video embedded screen, i.e., a screen in the markup language document.

In addition, since the DVD-video embedded in the markup language document is the "OBJECT" element of the markup language elements, the embedded DVD-video may be focused using the navigation keys of the user input device. In other words, the embedded DVD-video is focused on as the "OBJECT" element of the markup language elements.

Reference numeral 701 denotes a first focused element of the markup language document, and reference numeral 702 denotes a second focused element due to the input of the navigation key, such as a tab key or a direction key, by the user.

Figure 8:
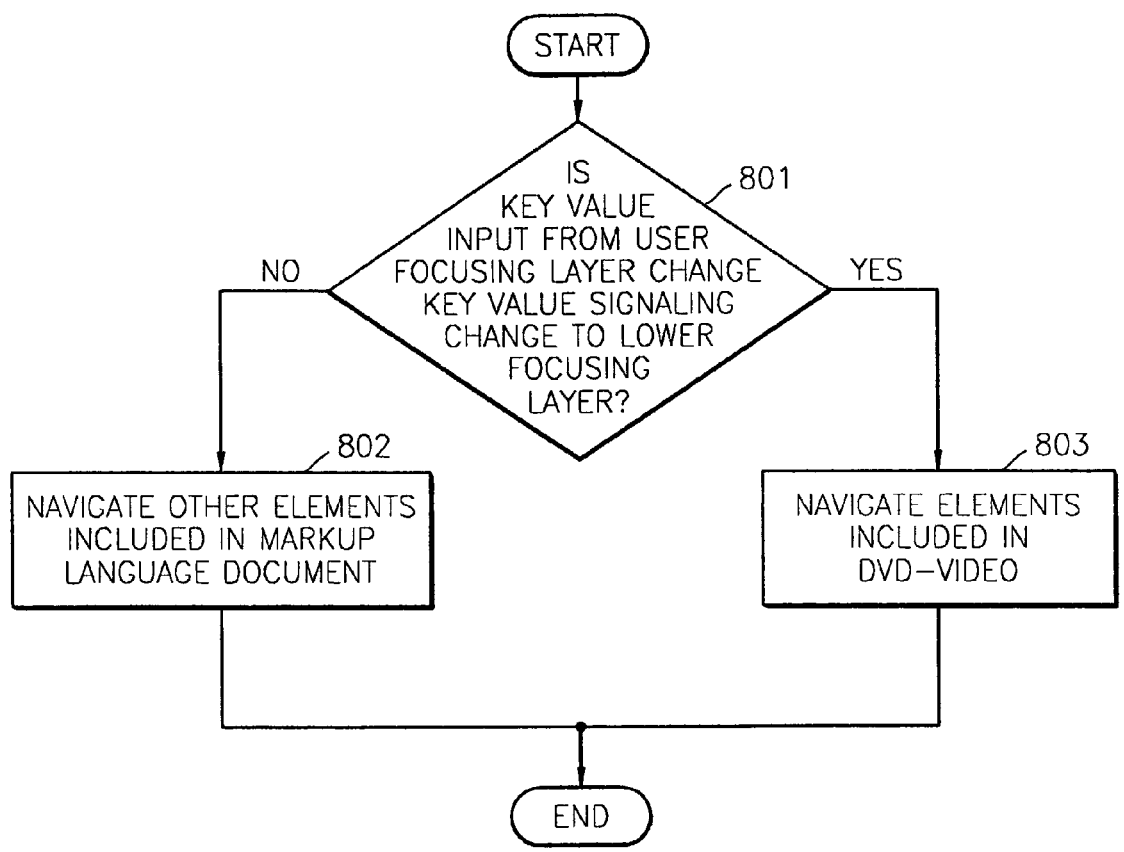

FIG. 8 is a flowchart explaining a method of processing the operation of navigation keys in the case where the embedded DVD-Video is focused on. When the embedded DVD-video as the "OBJECT" element is focused on by manipulating the navigation keys, the elements which are navigable using the navigation keys are changed according to the input of a focusing layer change key, for example, an ENTER key, of the user input device, because the DVD-video includes a lower focusing layer to be navigated.

Referring to FIG. 8, it is determined whether the key value input from the user is a focusing change key value signaling change to the lower focusing layer in operation 801. If it is determined in operation 801 that the focusing change key value is input, focusing is navigated among the DVD-video elements in operation 803 and the focusing is not movable to the elements included in the markup language document. If it is determined in operation 801 that the focusing change key value is not input, focusing navigation is performed on the elements included in the markup language document in operation 802.

Figure 9A:
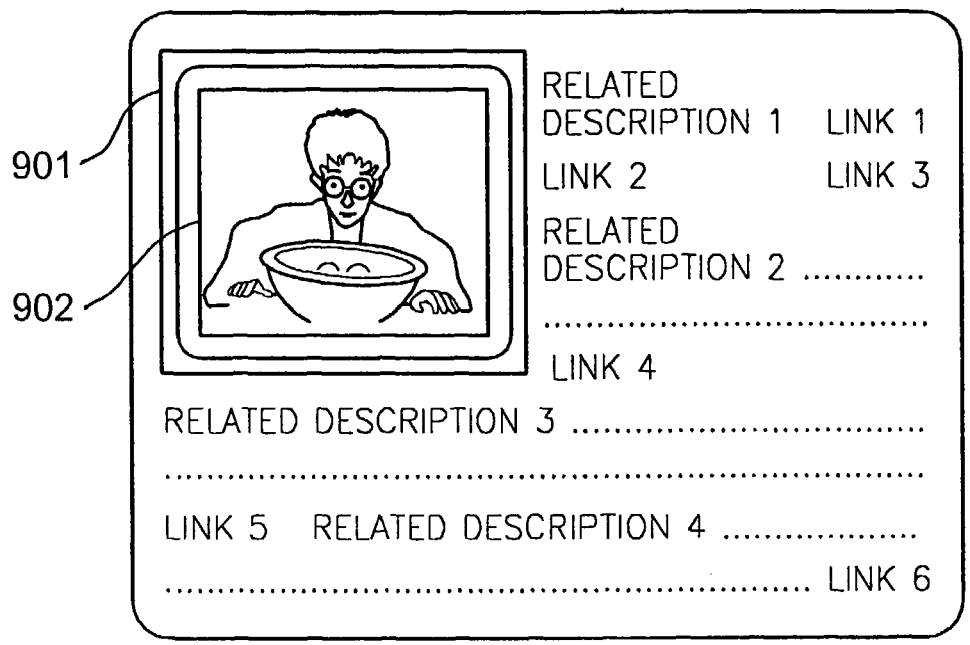
FIG. 9A shows focusing on an embedded DVD-video.
Figure 9B:
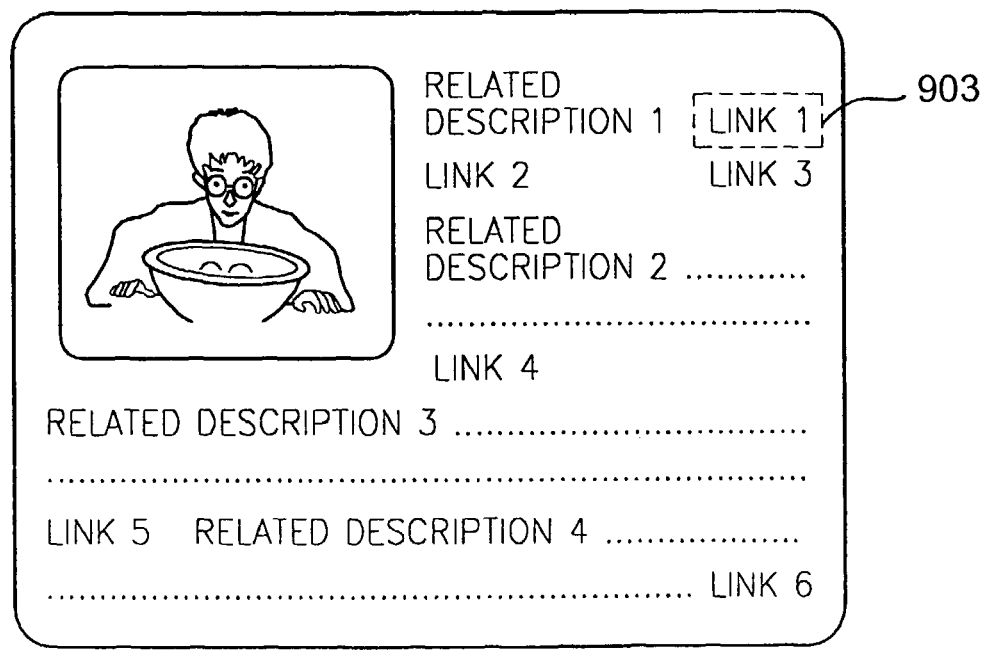
FIG. 9B shows moving the focusing from the embedded DVD-video to another element in the same focusing layer.
Figure 9C:
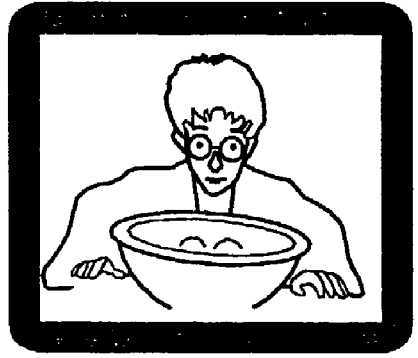

FIGS. 9A through 9C are examples of processing the operation of the navigation keys in the case where the embedded DVD-Video is focused on.

When the DVD-video as the "OBJECT" element is embedded in the markup language document as the top-focusing layer, the layer where the navigation keys of the user input device operate is changed from the markup language document to the DVD-video by inputting the focusing layer change key value signaling change to the lower focusing layer, for example, the ENTER key. Here, since the DVD-video includes the lower focusing layer to be navigated, the layer may be changed from the markup language document to the DVD-video.

FIG. 9A illustrates a case where the embedded DVD-video is focused on, which is represented as being highlighted by two rectangles 901 and 902 superimposed on the DVD-video image. FIG. 9B illustrates the case where the focusing layer change key, for example, the ENTER key, is not input and the focusing moves from the DVD-video to another element included in the same focusing layer as that of the DVD-video. Here, "LINK 1" element is focused on in FIG. 9B as indicated by a dashed line rectangle. FIG. 9C illustrates the case where the focusing layer change key signaling change to the lower focusing layer, for example, the ENTER key, is input while the DVD-video is focused on as shown in FIG. 9A. In this case, the focusing is not movable to the other elements in the same focusing layer as that of the embedded DVD-video.

Figure 10A:
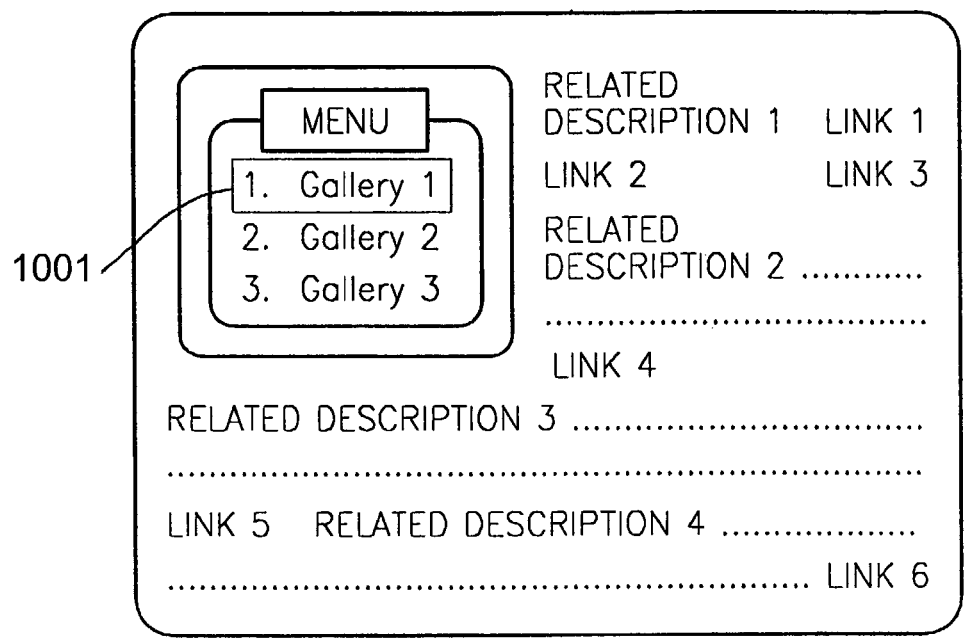
FIG. 10A shows focusing on an element in a lower focusing layer.
Figure 10B:
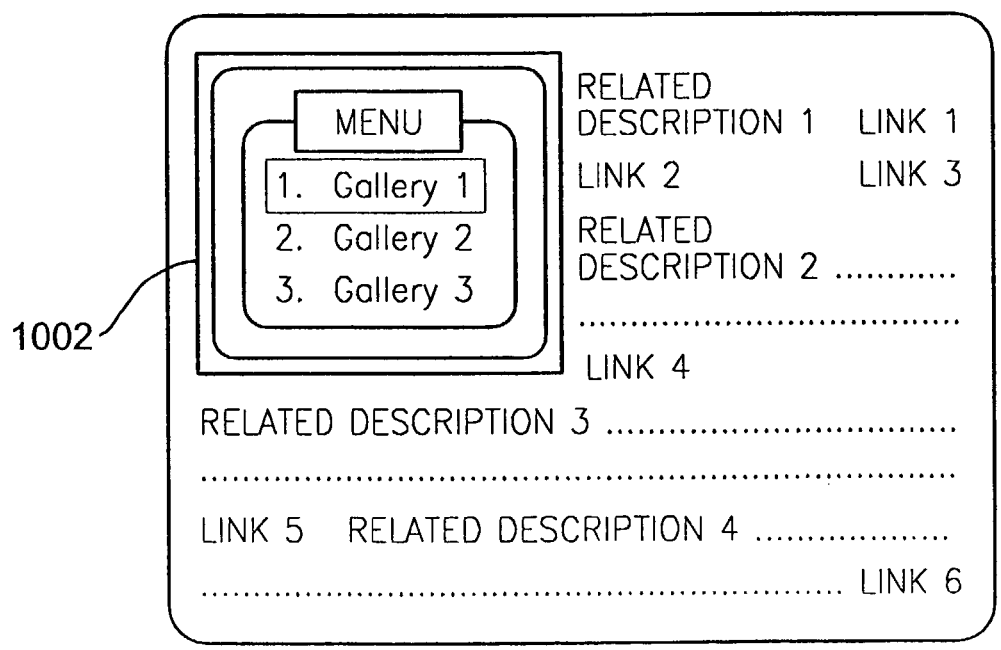
FIG. 10B shows focusing on an element in the top focusing layer.

FIGS. 10A and 10B are examples of changing the focusing from the embedded DVD-video to the markup language document.

When the user inputs the focusing layer change key signaling change to the lower focusing layer, for example, the ENTER key, using the user input device, the focusing moves from the markup language document as the top-focusing layer to the DVD-video as the lower focusing layer. Accordingly, the navigation keys of the user input device operate as in the case of the focusing method of the conventional interactive contents. In order to move the focusing from the DVD-video as the lower focusing layer to the markup language document as the top-focusing layer, the user inputs a focusing layer change key signaling change to the upper focusing layer, for example, an ESC key, of the user input device. Accordingly, the focusing moves from the DVD-video as the lower focusing layer to the markup language document as the top-focusing layer. Therefore, the embedded "OBJECT" element is focused on so that the embedded "OBJECT" element is highlighted.

FIG. 10A illustrates the case where "Gallery 1" element in the lower focusing layer is focused on as indicated by the rectangle 1001. FIG. 10B illustrates the case where "MENU"

element in the top-focusing layer is focused on as indicated by the rectangle 1002 by moving the focusing to the upper focusing layer.

Figure 11:
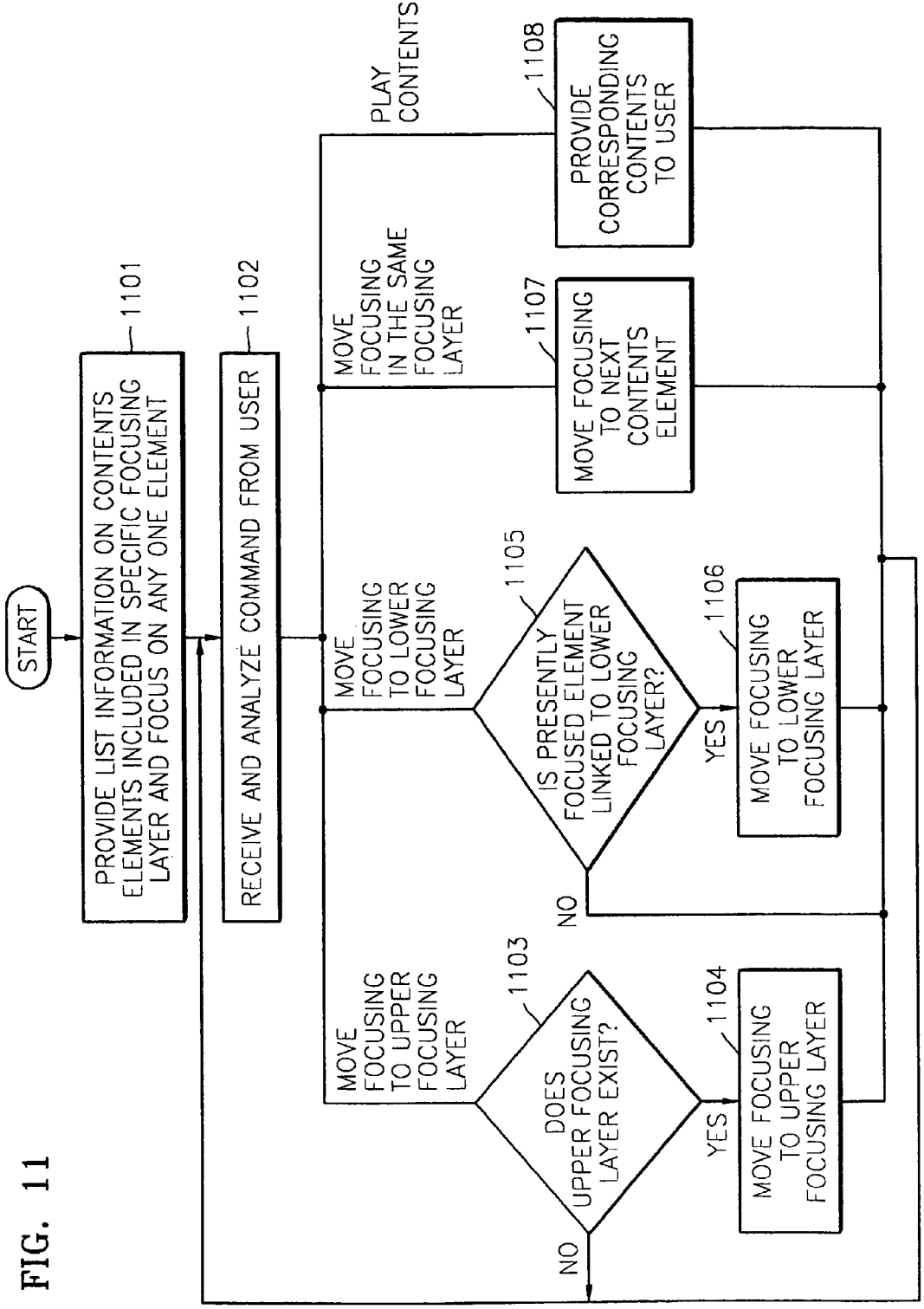
FIG. 11 is a flowchart explaining a multi-layer focusing method according to the present invention.

FIG. 11 is a flowchart for explaining the multi-layer focusing method according to the present invention. First, the contents elements included in a specific focusing layer are displayed and one of the displayed elements is focused on in operation 1101. Thereafter, a predetermined command, i.e., a predetermined key value, is received from the user and the received command is analyzed in operation 1102. If the command is to change the focusing layer to an upper focusing layer, it is checked whether the upper focusing layer exists in operation 1103. If the upper focusing layer exists, the focusing is moved to the upper focusing layer in operation 1104. If the command is to change the focusing layer to a lower focusing layer, it is determined whether the presently focused element is linked to an element of the lower focusing layer in operation 1105. If it is determined in operation 1105 that the presently focused element is linked to the element of the lower focusing layer, the focusing is moved to the lower focusing layer in operation 1106. If the command is to move the focusing within the same focusing layer, the focusing moves to the contents element according to a predetermined order, for example, a tabbing order, in in operation 1107. If the command is to play the contents, the corresponding contents are provided to the user in operation 1108.

Figure 12:
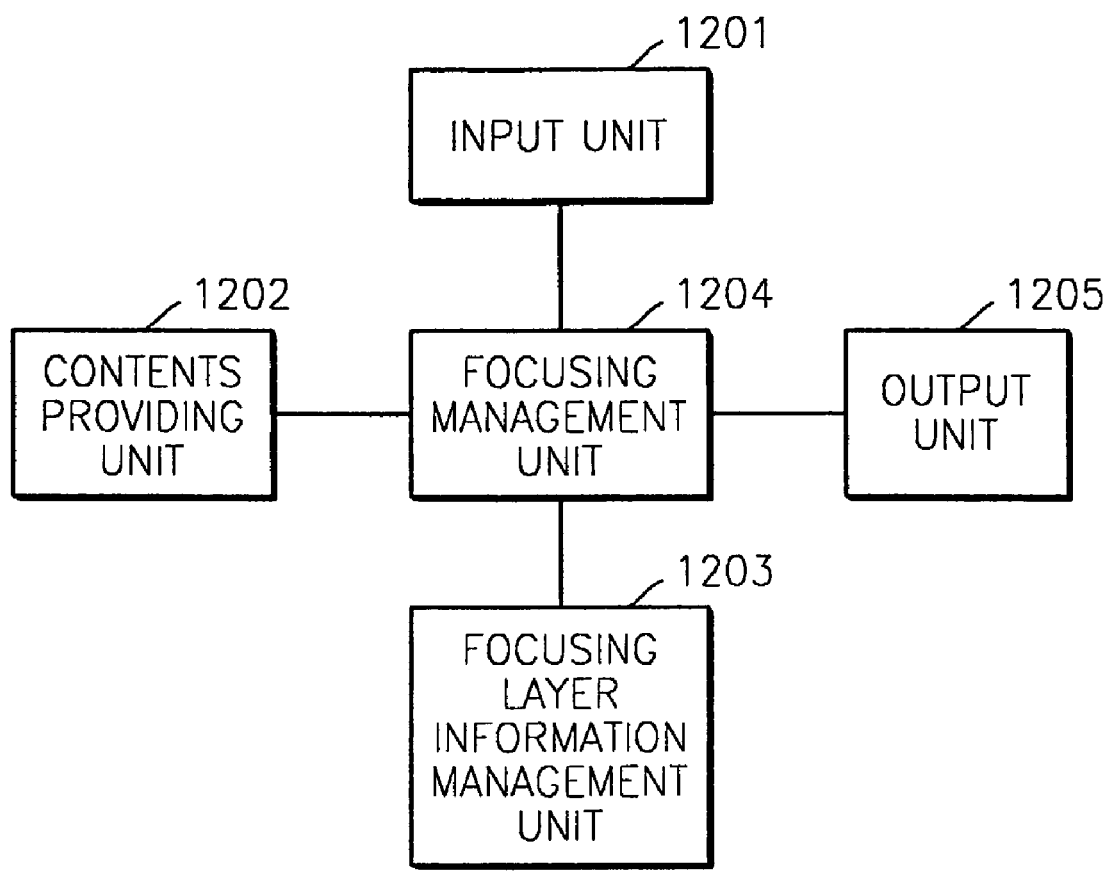
FIG. 12 is a block diagram illustrating the structure of an apparatus for managing multi-layer focusing according to the present invention.

FIG. 12 is a block diagram illustrating an apparatus for managing multi-layer focusing according to the present invention. The apparatus for managing multi-layer focusing according to the present invention includes an input unit 1201, a contents providing unit 1202, a focusing layer information management unit 1203, a focusing management unit 1204, and an output unit 1205.

The input unit 1201 receives a command to move the focusing within the same focusing layer or to change the focusing layer, from the user.

The contents providing unit 1202 stores the contents which will be provided to the user. Here, when the contents are provided to the user over a communication network, such as the Internet, the contents providing unit 1202 includes the communication network.

The focusing layer information management unit 1203 manages the contents, which will be provided to the user, and the focusing layer information, which is allotted to each of the elements. Here, the focusing layer information of the elements, which may be included in the attribution information on the elements, may include the focusing layer information on the corresponding element, the focusing layer information on the upper focusing layer, and the focusing layer information on the element linked to the corresponding element.

The focusing management unit 1204 represents the elements linked to the contents which will be provided to the user, receives the command about focusing from the user via the input unit 1201, and receives the information on the focusing layer of the elements from the focusing layer information management unit 1203 in order to move the focusing. In addition, when the command to play specific contents is input by the user, the focusing management unit 1204 receives the contents from the contents providing unit 1202 and provides the contents to the user through the output unit 1205.

The focusing layer information, which is allotted to the contents and the elements linked to the contents, may be formed in the structure shown in Table 1

TABLE 1

| element | linked contents | focusing layer information on the element | focusing layer information on the upper focusing layer | linked element in the upper focusing layer | existence of lower focusing layer |
|---|---|---|---|---|---|
| link 1 | DVD-video | 1 | none | none | yes |
| Gallery 1 | movie list | 2 | 1 | link 1 | yes |
| Gallery 2 | music video list | 2 | 1 | link 1 | yes |
| . | . | . | . | . | . |
| . | . | . | . | . | . |

The present invention may be realized as a program which is executable on a computer, and may be performed by the computer using a recording medium which is readable by the computer.

Here, the recording medium may be any kind of recording device in which data are recorded, for example, a magnetic recording medium such as ROM, a floppy disk, or a hard disk, an optical medium such as CD-ROM or a DVD, and carrier waves such as transmission over the Internet.

According to the present invention, any kind of media having interactive contents formed by using markup language is navigable using a device having a limited number of input keys, such as a television remote controller.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of focusing contents provided in a multi-layer structure, the method comprising:

allotting predetermined focusing layer values to contents elements linked to contents to be provided to a user, to form focusing layers of a markup language document;

providing the contents elements included in a predetermined focusing layer and focusing on any one contents element of the contents elements provided to the user;

receiving a predetermined command from the user; and moving the focusing based on the focusing layer values when the received command is to move the focusing.

2. The method of claim 1, wherein the moving of the focusing comprises:

determining whether an upper focusing layer of a present focusing layer exists in the case where the command is to change the present focusing layer to the upper focusing layer; and if the upper focusing layer exists, providing contents elements included in the upper focusing layer to the user and focusing on any one contents element included in the upper focusing layer.

3. The method of claim 1, wherein the moving of the focusing comprises:
   determining whether a lower focusing layer is linked to the focused on contents element in the case where the command is to change the focusing layer to the lower focusing layer; and
   if the lower focusing layer is linked to the focused on contents element, providing contents elements included in the lower focusing layer to the user and focusing on any one contents element included in the lower focusing layer.

4. The method of claim 1, wherein the moving of the focusing comprises moving the focusing to a next contents element based on a predetermined order in the case where the command is to move the focusing within the same focusing layer.

5. An apparatus for managing multi-layer focusing, the apparatus comprising:
   a contents providing unit which provides contents which are linked to contents elements and are to be provided to a user;
   a focusing layer information management unit which allots predetermined focusing layer values to the contents elements which are linked to the contents to be provided to the user, to form focusing layers;
   an input unit which receives commands from the user to move the focusing;
   an output unit which provides the contents to the user, provides predetermined contents elements, and represents focused on contents elements linked to the contents; and
   a focusing management unit which provides the contents elements included in a specific focusing layer and the presently focused on contents element to the output unit and moves the focusing based on the focusing layer values in the case where the command is to move the focusing.

6. The apparatus of claim 5, wherein the input unit is an input device comprising predetermined buttons or keys.

7. A non-transitory recording medium, comprising:
   a recording area which stores a program which provides instructions which enable a computer to:
      allot predetermined focusing layer values to contents elements linked to contents to be provided to a user, to form focusing layers;
      provide the contents elements included in a predetermined focusing layer and focus on any one contents element of the contents elements provided to the user;
      enable the computer to receive a predetermined command from the user; and
      move the focusing based on the allotted focusing layer values when the received command is to move the focusing.

8. The non-transitory recording medium of claim 7, wherein the move the focusing instructions enable the computer to:
   determine whether an upper focusing layer of a present focusing layer exists in the case where the command is to change the present focusing layer to the upper focusing layer; and
   provide the contents elements included in the upper focusing layer to the user and focus on any one of the contents elements included in the upper focusing layer, if the upper focusing layer exists.

9. The non-transitory recording medium of claim 7, wherein the move the focusing instructions enable the computer to:
   determine whether a lower focusing layer is linked to the focused on contents element in the case where the command is to change the focusing layer to the lower focusing layer; and
   if the lower focusing layer is linked to the focused on contents element, provide the contents elements included in the lower focusing layer to the user and focus on any one contents element included in the lower focusing layer.

10. The non-transitory recording medium of claim 7, wherein the move the focusing instructions enable the computer to move the focusing to a next contents element based on a predetermined order where the command is to move the focusing within the same focusing layer.

11. A method of focusing contents provided in a multi-layer structure, the method comprising:
   forming a plurality of focusing layers of contents elements linked to contents to be provided to a user, the focusing layers ordered in a higher to lower fashion and including at least a top focusing layer and a bottom focusing layer, each contents element having a plurality of assigned focusing layer values;
   focusing on a current one of the focusing layers or on a contents element in the current one of the focusing layers;
   receiving an input command from the user;
   determining whether the input command corresponds to a first command to move the focusing within the current focusing layer, a second command to move the focusing to a higher focusing layer or a third command to move the focusing to a lower focusing layer;
   moving the focusing to another contents element within the same focusing layer, if the input command is the first command;
   checking whether the current focusing layer is the top focusing layer based on a first of the plurality of assigned focusing layer values and moving the focusing to a next higher focusing layer, if the input command is the second command and the current focusing layer is not the top focusing layer; and
   checking whether the current focusing layer is the bottom layer based on a second of the plurality of assigned focusing layer values and moving the focusing to a next lower focusing layer, if the command is the third command and the current focusing layer is not the bottom focusing layer.

12. The method of claim 11, wherein the moving of the focusing to another contents element in the current focusing layer is in accordance with a predetermined order.

* * * * *